UNITED STATES PATENT OFFICE.

ERNST ULRICHS, OF ELBERFELD, GERMANY, ASSIGNOR TO THE FIRM OF WÜLFING, DAHL & CO. ACTIENGESELLSCHAFT, OF BARMEN, GERMANY.

RED MONO-AZO DYE.

No. 911,186.   Specification of Letters Patent.   Patented Feb. 2, 1909.

Application filed September 4, 1907. Serial No. 391,356.

*To all whom it may concern:*

Be it known that I, ERNST ULRICHS, a subject of the King of Prussia, German Emperor, and resident of Alter Markt, Elberfeld, Province of the Rhine, German Empire, have invented certain new and useful Improvements in Red Mono-Azo Dyes, of which the following is an exact specification.

This invention relates to a process for the manufacture of a red mono-azo-dye specially adapted for the manufacture of lakes. In addition to dyeing and printing, Turkey red oil is also used in the manufacture of tar colors and lakes. If for instance gamma-diazo-nitrobenzol is combined with beta-naphthol in the presence, or in the absence, of Turkey red oil dyes produced show scarcely any difference of shade, but the dye produced with Turkey red oil favorably differs from that manufactured without it, by the fact that it can be easily mixed with substrata such as heavy spar. The action of Turkey red oil in this case is therefore merely to render the dye produced more suitable for further treatment. A case is further known in which Turkey red oil also exercises a considerable influence on the shades. If namely gamma-diazo-nitrobenzol is combined with beta-naphthol to which about 55% of 2-naphthol-7-sulfo-acid have been added, in the presence of Turkey red oil, a dye is produced which is not much more blue than that produced without Turkey red oil or without 2-naphthol-7-sulfo-acid.

Since the influence of Turkey red oil in the formation of an azo-dye without sulfo-group is limited only to that one case, where besides the presence of 5% of 2-naphthol-7-sulfo-acid is also necessary, it is highly surprising to find that in the case of an azo dye with a sulfo-group, Turkey red oil is also capable of bringing about a considerable change of shade. If namely the diazo-compound of the 2-naphthylamin-1-sulfo-acid is combined with beta-naphthol sodium, with addition of Turkey red oil, the dye produced scarcely differs outwardly from that produced without Turkey red oil. In further treatment, however, the former in reaction with calcium salts gives lakes which are very considerably more blue than those prepared with the commercial lithol red. As the calcium lake of the dye 2-diazonaphthalin-1-sulfo-acid + beta-naphthol + Turkey red oil is itself considerably more blue than the largely used blue red lake from gamma-diazo-nitro-benzol + naphthol + 2 naphthol-7-sulfo acid + Turkey red oil, from which it advantageously differs by being insoluble in oil, attempts to find such substitute having been made for a long time it will undoubtedly obtain great importance in the lake industry owing to its beautiful shade, fast color, covering capacity, resistance to water, alcohol and lime and insolubility in oil.

The manufacture of the dye is for instance as follows:— 22.3 gr. 2 - naphthylamin-1-sulfo-acid 5.3 gr. soda are dissolved in about 100 c. cm. water, mixed with 150 c. cm. cold water and the solution of 7.c. cm. sodium nitrite in 70 c. cm. water added. The said mixture introduced into a diluted hydrochloric acid containing 7.3 gr. HCl in 300 c. cm. of water. The diazo-compound produced is introduced into a solution of 15 gr. beta-naphthol, 4 gr. caustic soda and 50 gr. Turkey red oil of 50% in 1000 c. cm. water. The dye separates in the form of an orange red precipitate. Further experiments have proved that the presence of soap, stearic acid, albumen, casein, tragacanth, starch etc., at the combination of the dye affects the shade to a certain extent, but the best results have been obtained by me with Turkey red oil.

The red mono azo dye according to the present invention is practically insoluble in cold water and is only slightly soluble in boiling water when it produces a red color. Concentrated sulfuric acid dissolves the dye according to the present invention producing a blue red color. When boiled with a solution of calcium chlorid the dye yields a blue red precipitate while the corresponding dye produced without employing Turkey red oil produces a red precipitate when treated in the same manner.

Having thus fully described the nature of my invention what I desire to secure by Letters Patent of the United States is:—

1. A red mono-azo-dye which is produced by the combination of diazotized 2-naphthylamin-1-sulfo-acid with beta naphthol in the presence of Turkey red oil, said dye being practically insoluble in water and only slightly soluble in boiling water when it produces a red color, also this dye dissolves in concentrated sulfuric acid producing a blue red color and when boiled with a calcium chlorid solution yields a blue red precipitate.

2. A process for producing a red monoazo-dye comprising combining diazotized 2-naphthylamin-1-sulfo-acid with beta naphthol in the presence of Turkey red oil, substantially as set forth.

In witness whereof I have hereunto set my hand in the presence of two witnesses.

ERNST ULRICHS.

Witnesses:
WILLIAM MAYNER,
HENRY HASPER.